United States Patent
Ishida

[11] Patent Number: 6,003,627
[45] Date of Patent: Dec. 21, 1999

[54] MOTOR-DRIVEN VEHICLE CONTROL APPARATUS

[75] Inventor: Yoshinobu Ishida, Kobe, Japan

[73] Assignee: Nabco Limited, Japan

[21] Appl. No.: 08/905,158

[22] Filed: Aug. 1, 1997

[30] Foreign Application Priority Data

Aug. 8, 1996 [JP] Japan .................................. 8-227391

[51] Int. Cl.⁶ .................................................. B62K 11/00
[52] U.S. Cl. ............................................ 180/206; 180/65.8
[58] Field of Search .................................. 180/6.5, 65.1, 180/65.2, 65.8, 205, 206, 207, 907, 701.02; 318/139, 55

[56] References Cited

U.S. PATENT DOCUMENTS

| | | | |
|---|---|---|---|
| 4,634,941 | 1/1987 | Klimo ...................................... | 318/139 |
| 5,234,066 | 8/1993 | Ahsing et al. ............................ | 180/6.5 |
| 5,270,624 | 12/1993 | Lautzenhiser ............................ | 318/432 |
| 5,732,786 | 3/1998 | Fujigaki .................................. | 180/19.3 |
| 5,746,282 | 5/1998 | Fujiwara et al. ......................... | 180/6.2 |
| 5,771,988 | 6/1998 | Kikutani et al. ......................... | 180/65.5 |
| 5,806,621 | 9/1998 | Soda et al. ............................... | 180/206 |
| 5,818,189 | 10/1998 | Uchiyama et al. ....................... | 318/488 |
| 5,857,537 | 1/1999 | Matsumoto et al. ..................... | 180/206 |
| 5,910,714 | 6/1999 | Buchanan et al. ....................... | 318/139 |
| 5,924,511 | 7/1999 | Takata ..................................... | 180/205 |
| 5,927,414 | 7/1999 | Kan et al. ............................... | 180/19.3 |

FOREIGN PATENT DOCUMENTS

| | | |
|---|---|---|
| 0691232 | 1/1996 | European Pat. Off. . |
| 8-52177 | 2/1996 | Japan . |

*Primary Examiner*—Robert J. Oberleitner
*Assistant Examiner*—Daniel Yeagley
*Attorney, Agent, or Firm*—Banner & Witcoff, Ltd.

[57] ABSTRACT

Manual driving force applied by a wheelchair driver to a motor-driven wheelchair is sensed by a manual-driving-force sensing unit. When the manual driving force reaches a preset value, a control unit makes a motor generate a mechanical driving force supplementary to the manual driving force. The control unit subtracts the preset value from the manual driving force to determine an amount of change by which the current mechanical driving force should be changed, and adds the amount of change to the current mechanical driving force to develop a new mechanical driving force.

8 Claims, 10 Drawing Sheets

MOTOR-DRIVEN VEHICLE CONTROL APPARATUS

This application is based on Japanese Patent Application No. HEI 8-227391 filed on Aug. 8, 1996 entitled "Motor-Driven Vehicle Control Apparatus", the content of which is incorporated hereinto by reference.

FIELD OF THE INVENTION

This invention relates to a motor control apparatus for use with motor-driven vehicles, such as a motor-driven wheelchair.

BACKGROUND OF THE INVENTION

A motor-driven vehicle, e.g. a motor-driven wheelchair, has a pair of drive wheels which are driven by motors. A control apparatus controls the respective motors.

An example of control apparatus for use with a motor-driven wheelchair is shown in EP 0 691 232 A2 published on Jan. 10, 1996 which is incorporated hereinto by reference. The motor-driven wheelchair with the motor control apparatus shown in this European publication includes manual-driving-force sensing units which sense the magnitudes of forces applied to the wheelchair to move it by an attendant to a user of the wheelchair. The manual-driving-force sensing units produce manual-driving-force representative signals which are proportional to the magnitudes of the manual driving forces applied to the wheelchair. The manual-driving-force representative signals are applied to the control apparatus, which controls the motors in such a manner as to produce wheel driving forces proportional to the corresponding manual-driving-force representative signals.

As the manual driving forces applied to the wheelchair increase, the wheel driving forces developed by the respective motors increase proportionally. Accordingly, when the running resistance of the wheelchair increases, e.g. when the wheelchair moving on a flat path must go up a slope, so that the wheel driving forces of the motors must be increased, the manual driving forces must be increased, too. That is too burdensome to an attendant having small strength.

With the control apparatus shown in the above-quoted European publication, changes of manual driving forces immediately cause changes of the wheel driving forces of the motors. Accordingly, if, for example, the manual driving forces for driving the wheelchair in the forward direction are increased, which results in acceleration at a high rate of the wheelchair, the attendant may not be able to follow the movement of the wheelchair. Then, he or she will try to reduce the manual driving forces, or, in some cases, may apply to the wheelchair manual driving forces to cause the wheelchair to move in the opposite, i.e. backward direction. In such a case, the wheel driving forces developed by the motors may abruptly decrease, or the motors may develop wheel driving forces which tend to drive the wheels in the backward direction. In response to such changes of the wheel driving forces of the motors, the attendant may increase his or her manual driving forces to drive the wheelchair in the forward direction. As a result, the wheelchair is accelerated in the forward direction at a high rate, again. In this way, the wheelchair is alternately accelerated and decelerated. In other words, the moving speed of the wheelchair is unstable. Accordingly, in order to drive the wheelchair at a stable speed, the attendant needs to have skill in driving the wheelchair.

An object of the present invention is to provide a control apparatus for use with a motor-driven vehicle which can make motors of the motor-driven vehicle increase their driving forces, without increasing burden on a vehicle operator. Hereinafter, driving force provided by a motor is referred to as supplementary, mechanical driving force, or supplementary driving force, or mechanical driving force.

Another object of the present invention is to provide a motor control apparatus for use with a motor-driven vehicle which can make the supplementary, mechanical driving forces change smoothly even if manual driving forces applied to the vehicle changes abruptly.

SUMMARY OF THE INVENTION

According to a first aspect of the present invention, a control apparatus including a control unit is provided for a motor-driven vehicle. The control unit, when a manual driving force a person applies to the vehicle to drive it exceeds a preset value, makes a drive unit develop a supplementary, mechanical driving force. The control unit computes the amount by which a current supplementary driving force is to be changed, by subtracting the preset value from the manual driving force. The control unit makes the drive unit develop a new mechanical driving force, taking the computed amount of change into account.

Because the amount by which the current mechanical driving force is to be changed is the value resulting from subtracting the preset value from the manual driving force, the mechanical driving force increases continuously from the current value by the difference between the manual driving force and the preset value even if the manual driving force remains unchanged. Accordingly, increase of the running resistance encountered when the vehicle is travelling can be dealt with without need for increasing the manual driving force.

By changing the mechanical driving force by applying a manual driving force above the preset value, and then decreasing the manual driving force to the preset value and maintaining it at the preset value, the motor-driven vehicle is driven at a constant driving force. Then, in order to drive the vehicle at a constant force, it is sufficient to apply a manual driving force equal to the preset value to the vehicle.

The control unit may calculate a monotonously changing amount by which the current mechanical driving force is to be changed, by multiplying the manual driving force minus the preset value by a given factor, e.g. a factor greater than 0 and smaller than 1. A new mechanical driving force is developed by the driving unit with the calculated amount of change, by which the mechanical driving force is to be changed, taken into account.

With the above-described factor used, the amount of change by which the mechanical driving force is to be changed is smaller than the amount of change calculated by subtracting the preset value from the manual driving force, and, therefore, the mechanical driving force changes more gradually than the change of the manual driving force, i.e. the mechanical driving force has a gentle response curve. Accordingly, the driving of the vehicle is easier.

According to a second aspect of the present invention, a control apparatus including a control unit is provided for a motor-driven vehicle. The control unit, when a manual driving force a person applies to the vehicle to drive it exceeds a preset value, makes a drive unit develop a mechanical driving force. The control unit sets a factor for each of a plurality of control regions defined by plural threshold values, and determines which one of the control regions a value related to the manual driving force lies in. Then, the control unit computes the monotonously changing amount by which the current mechanical driving force is to be changed, by multiplying the result of the subtraction of the preset value from the manual driving force, by the factor for the determined control region. The computed amount and the current mechanical driving force are taken into account together by the control unit when it makes the drive unit develop a new mechanical driving force.

Each of the factors for the respective control regions may be a value greater than 0 and smaller than 1.

The value related to the manual driving force may be the manual driving force itself or the manual driving force minus the preset value.

The response of the mechanical driving force provided by the drive unit can be freely adjusted, depending on the magnitude of the amount of change for the manual driving force relative to the preset value or on the magnitude of the amount of change for the manual driving force itself. For example, when the manual driving force changes greatly relative to the preset value, the drive unit is controlled to provide a smaller or larger amount of change for the mechanical driving force.

The factor for the control region in which a value corresponding to the preset value lies may be smaller than the factor for other control regions. In this case, when the manual driving force changes in an area near the preset value, the response of the mechanical driving force is slow so that the vehicle can be prevented from being abruptly accelerated or decelerated. Thus, the behavior of the motor-driven vehicle can be stabilized.

Furthermore, with this arrangement, it is possible to keep straight the direction of movement of a vehicle which includes two manual-driving-force sensing units for respective ones of two drive wheels so that the drive wheels can be driven independently of each other, even when the two manual-driving-force sensing units sense different magnitudes of manual driving force near the preset value.

The factor for the control region in which a value corresponding to the preset value lies can have a value which is substantially equal to zero. With such a factor, the mechanical driving force substantially does not change even when the manual driving force changes in an area near the preset value, so that the vehicle operation can be stable.

Furthermore, with this arrangement, it is possible to keep straight the direction of movement of a vehicle which includes two manual-driving-force sensing units for respective ones of two drive wheels so that the drive wheels can be driven independently of each other, even when the two manual-driving-force sensing units sense different magnitudes of manual driving force near the preset value.

Three or more control regions may be provided. The factor for the control region in which a value corresponding to the preset value lies and the factor for the control region farthest from the value corresponding to the preset value are smaller than the factors for the remaining control regions. With this arrangement, because of the use of a larger factor for the remaining control regions, a desired driving force can be readily reached, and once the desired driving force is obtained, the vehicle can be driven with substantially the desired driving force by maintaining the manual driving force at the preset value. Thus, the time period during which the manual driving force deviates from the preset value can be short. In addition, because the factor for the farthest control region is small, even if the manual driving force changes too largely, the vehicle can be prevented from being abruptly accelerated or decelerated. Thus, the motor-driven vehicle can be easily operated.

According to a third aspect of the present invention, a control apparatus with a control unit is provided for a motor-driven vehicle.

The control unit, when a manual driving force a person applies to the vehicle to drive it exceeds a preset value, makes a drive unit develop a mechanical driving force. The control unit multiplies the value obtained by subtracting the preset value from the manual driving force, by a predetermined factor to thereby calculate the amount of change by which the mechanical driving force to be developed by the drive unit is to be changed. This amount of change is expressed by an n-th order function, where n is a number equal to two or larger, and increases monotonously. The control unit takes the calculated amount of change into account when it makes the drive unit develop a new mechanical driving force.

According to the third aspect, the amount of change by which the mechanical driving force is to be changed is a monotonously increasing n-th order function, where n is 2 or greater. The amount of change by which the mechanical driving force is to be changed is expressed by, for example, $K*(Fin-Fs)^2$, where Fin is a manual driving force, Fs is a preset value, and K is a factor. Thus, when the manual driving force is near the preset value, the amount by which the mechanical driving force is to be changed is small, i.e. the response of the mechanical driving force is suppressed, so that a stable behavior of the vehicle is available. The response of the mechanical driving force increases as the manual driving force becomes remoter from the preset value, so that a desired mechanical driving force can be attained soon. After that, by maintaining the manual driving force at the preset value, the attained desired driving force can be maintained. Thus, the time period during which the manual driving force greater than the preset value can be reduced.

DESCRIPTION OF EMBODIMENT OF THE INVENTION

The present invention is now described with reference to an embodiment which is a motor-driven vehicle, e.g. motor-driven wheelchair with a control apparatus mounted on it.

Figure 1:
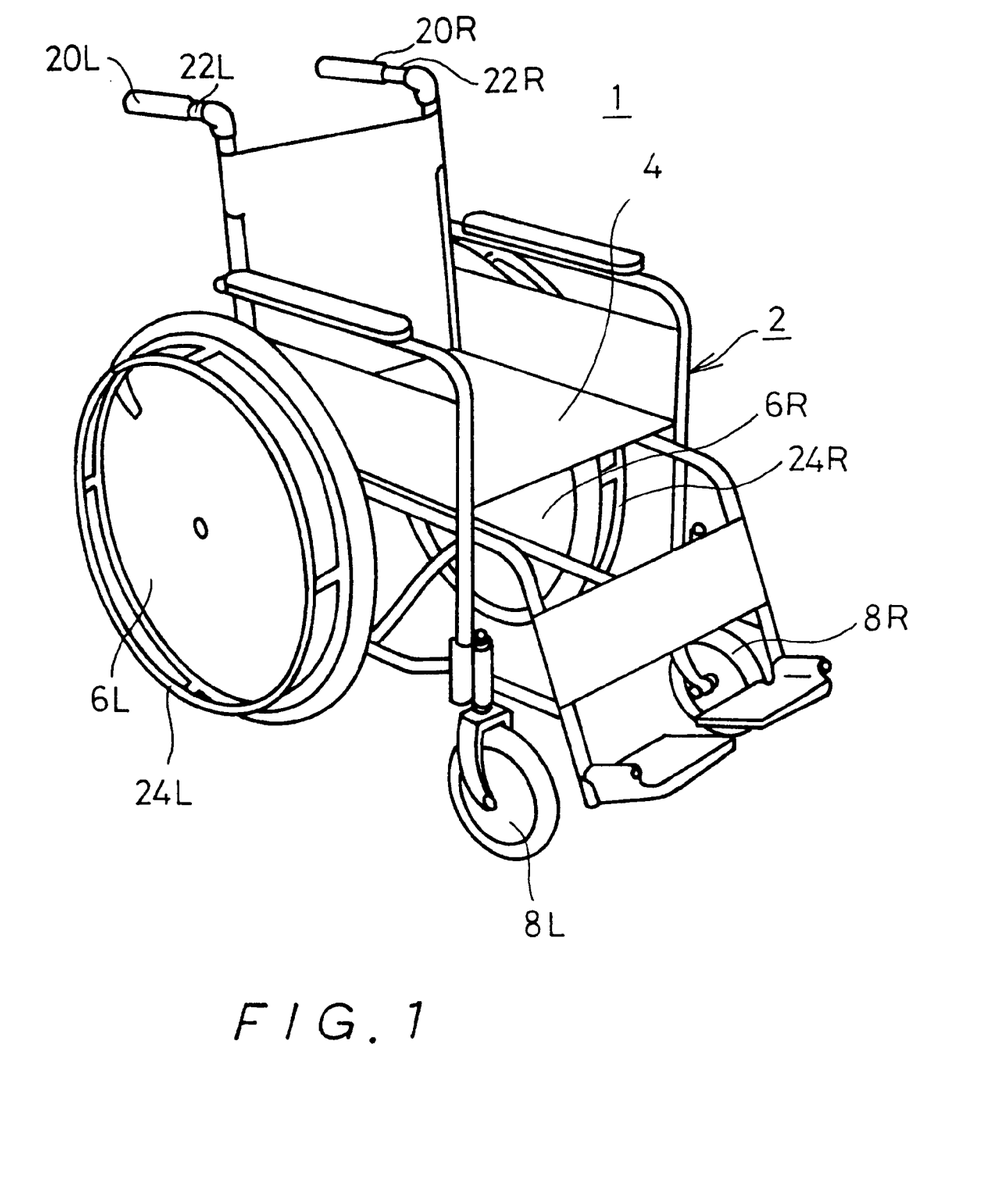
FIG. 1 is a perspective view of a motor-driven wheelchair with a control apparatus mounted thereon.

A motor-driven wheelchair 1 has a frame 2 of piping, as shown in FIG. 1. In the center portion of the frame 2, a textured or non-textured fabric seat 4 is stretched and fixed, which a user can sit on.

In the rear part of the frame 2, on its opposite sides, drive wheels 6R and 6L are rotatably mounted, and auxiliary wheels 8R and 8L are mounted to the front parts of the sides of the frame 2.

Figure 2:
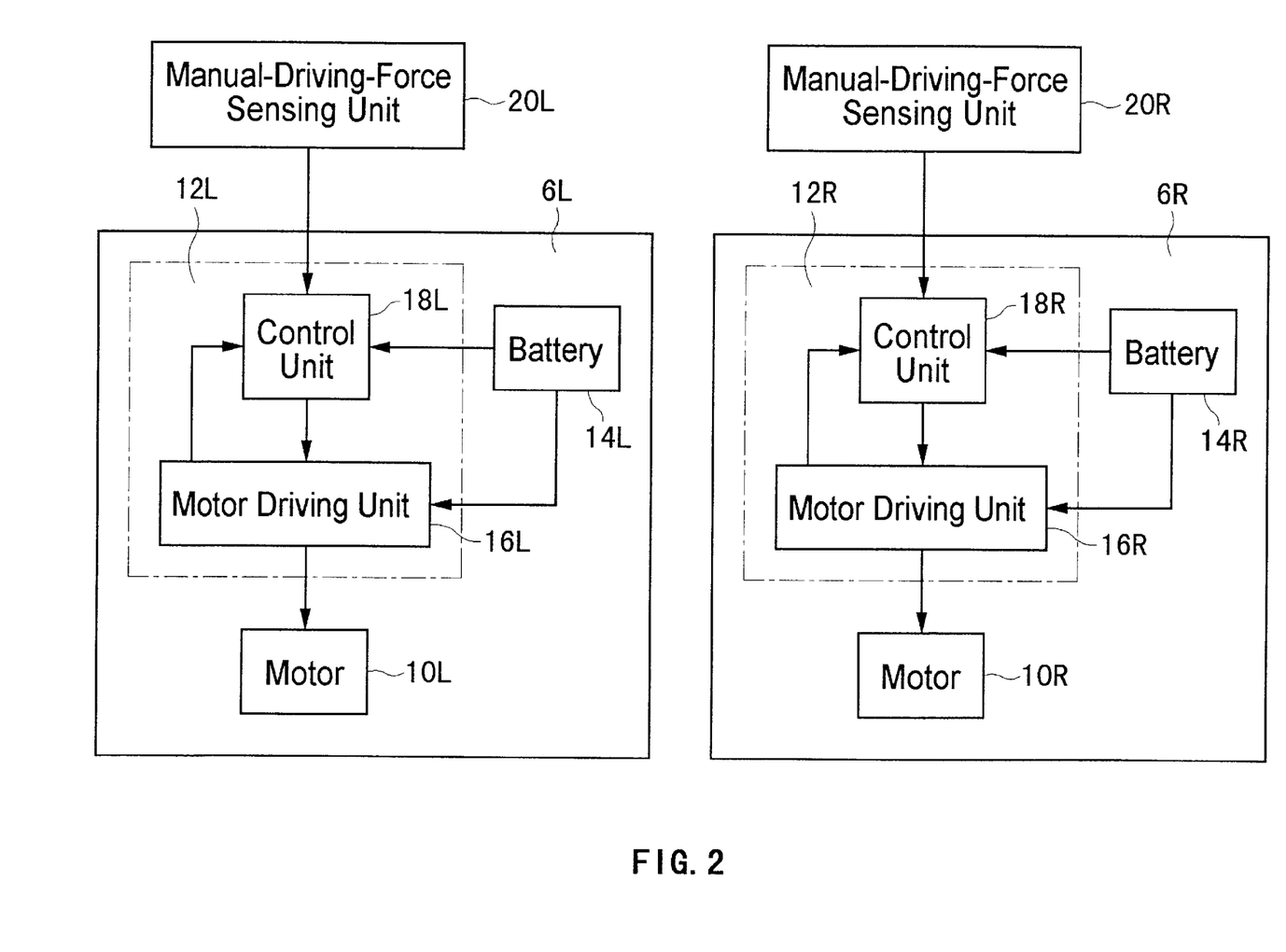
FIG. 2 is a block diagram of control apparatuses according to one embodiment of the present invention.

As shown in FIG. 2, drive units, e.g. electric motors 10R and 10L, are mounted within the internal spaces formed in the drive wheels 6R and 6L. Also, control apparatuses 12R and 12L for controlling the motors 10R and 10L, respectively, are mounted within the internal spaces of the drive wheels 6R and 6L. Further, batteries 14R and 14L from which the control apparatuses 12R and 12L are powered are also disposed within the internal spaces of the wheels 6R and 6L. The motors, the control apparatuses 12R and 12L, and the batteries 14R and 14L may be arranged within the internal spaces of the drive wheels 6R and 6L in the same manner as shown in FIGS. 5 and 6 of the previously cited EP 0 691 232 A2. Alternatively, the motors, the control apparatuses and the batteries may be mounted on the wheelchair 1 outside the drive wheels 6R and 6L, beneath the seat, for example.

The control apparatuses 12R and 12L include motor driving units 16R and 16L, respectively, which control the voltages from the batteries 14R and 14L to be applied to the motors 10R and 10L. For example, the motor driving units 16R and 16L may PWM (Pulse-Width-Modulation) control the voltages from the batteries 14R and 14L.

The control apparatuses 12R and 12L also include control units 18R and 18L which instruct the motor driving units 16R and 16L in what manner they should control the motors 10R and 10L, respectively. The control units 18R and 18L may comprise, for example, a microprocessor. The control units 18R and 18L receive manual-driving-force representative signals from manual-driving-force sensing units 20R and 20L. The control units 18R and 18L receive also motor drive signals which are applied to the motors 10R and 10L from the motor driving units 16R and 16L.

The manual-driving-force sensing units 20R and 20L are mounted on handlebars 22R and 22L, respectively, which extend rearward of the frame 2 in parallel with each other, as shown in FIG. 1. The manual-driving-force sensing units 20R and 20L are designed to be movable forward and backward along the handlebars 22R and 22L. An attendant of the user on the wheelchair exerts manual driving forces to the wheelchair 1 by the manual-driving-force sensing units 20R and 20L on the respective handlebars 22R and 22L to drive the wheelchair 1. The manual-driving-force sensing units 20R and 20L separately sense the manual driving forces exerted to the respective handlebars 22R and 22L, and develop respective manual-driving-force representative signals representing the sensed manual driving forces. Each of the manual-driving-force sensing units 20R and 20L may include a potentiometer whose resistance value changes in accordance with the magnitude of the manual driving force applied to the associated manual-driving-force sensing unit. Alternatively, a bridge circuit including a strain gauge may be used in place of the potentiometer.

Manual-driving-force sensing units shown in the previously cited EP 0 69 232 A2 may be used as the units 20R and 20L.

Figure 3:
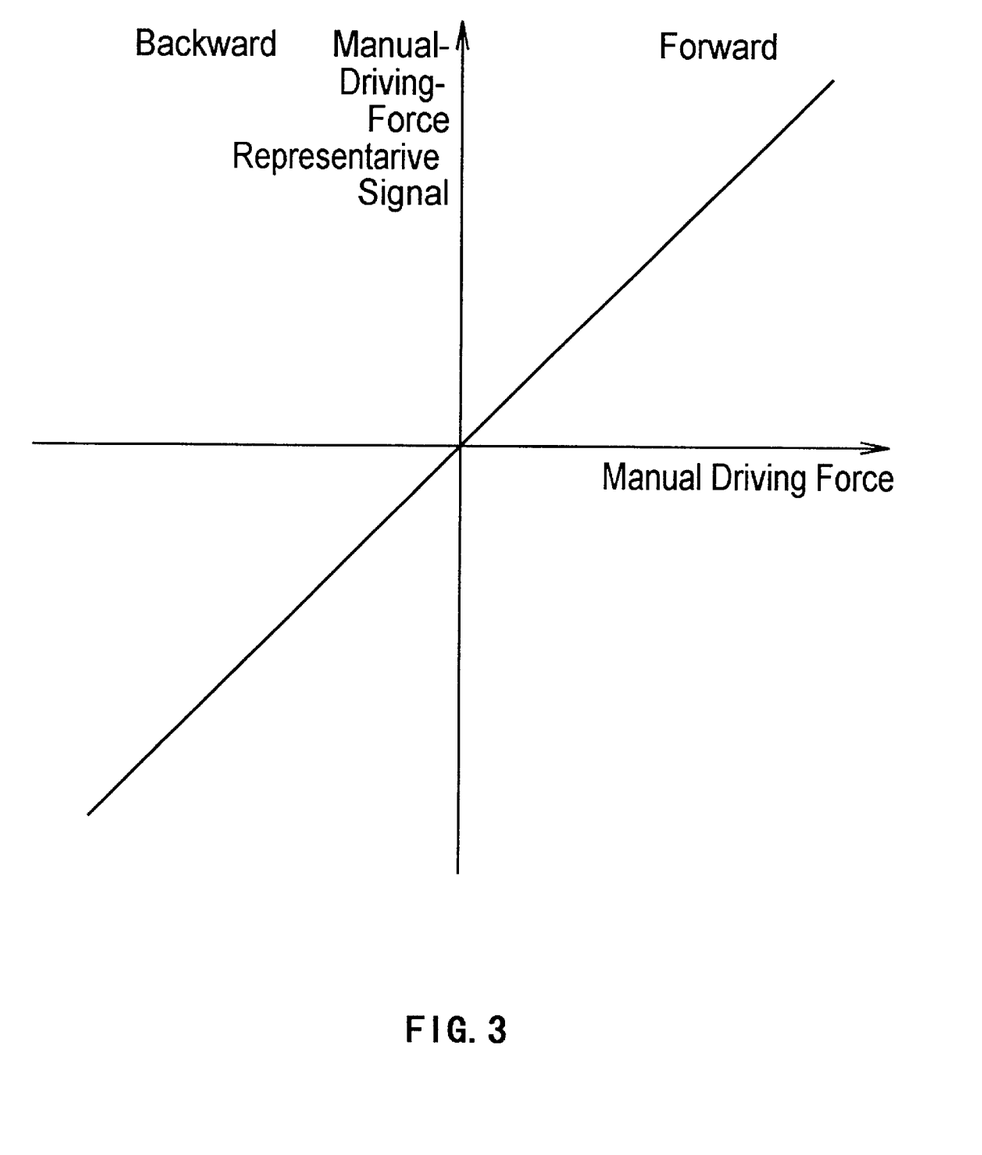
FIG. 3 is a diagram showing a relationship between a manual driving force and a manual-driving-force representative signal applied to the control apparatus of FIG. 2.

As shown in FIG. 3, the manual-driving-force representative signals from the manual-driving-force sensing units 20R and 20L may be zero when no manual driving force is exerted to them. When manual driving forces tending to drive forward the wheelchair 1 are applied to the manual-driving-force sensing units 20R and 20L, positive manual-driving-force representative signals having values proportional to the magnitudes of the respective manual driving forces are developed. If manual driving forces tending to drive backward the wheelchair 1 are applied to the manual-driving-force sensing units 20R and 20L, negative manual-driving-force representative signals having magnitudes proportional to the respective magnitudes of the applied manual driving forces are developed.

The manual-driving-force signal representative signal from the manual-driving-force sensing unit 20R is applied to the control unit 18R. The manual-driving-force signal representative signal from the manual-driving-force sensing unit 20L is applied to the control unit 18L. The control units 18R and 18L control the associated drive wheels 6R and 6L through the motor driving units 16R and 16L in accordance with the manual-driving-force representative signals applied thereto.

In place of the manual-driving-force sensing units shown and described, manual-driving-force sensing means may be mounted in association with hand rims 24R and 24L secured to the drive wheels 6R and 6L for independently detecting the magnitudes and senses of the manual driving forces which the user of the wheelchair applies to the respective hand rims 24R and 24L.

Now, the control of the drive wheels 6R and 6L provided by the control units 18R and 18L is described. Because the control provided by the control unit 18L is similar to the control provided by the control unit 18R, only the control provided by the unit 18R is described. It should be understood, however, that the control similar to the one described hereinafter is provided by the control unit 18L for the drive wheel 6L.

In the control unit 18R, the manual-driving-force representative signal from the manual-driving-force sensing unit 20R is sampled at predetermined intervals, e.g. at intervals of one-hundredth (0.01) second, for conversion into a digital manual-driving-force representative signal FinR. The control unit 18R applies such a control signal to the motor driving unit 16R that the unit 16R does not operate to drive the motor 10R when the motor 10R is not being driven and the digital manual-driving-force representative signal FinR is between preset values Fs and −Fs which have been preset for FinR. In other words, the motor 10R is not energized when a digital signal Fa(t−1) representing a current mechanical driving force described later is zero and the absolute value of FinR is equal to or smaller than the absolute value of Fs. In this case, accordingly, the wheelchair 1 is moved only by the manual driving force provided by the attendant.

When the absolute value of the digital manual-driving-force representative signal FinR exceeds the preset value Fs, the control unit 18R determines the difference between the absolute value of the signal FinR and the absolute value of the preset value Fs. This difference is added, as a digital signal dFa representing the amount by which the mechanical driving force is to be changed, to the digital signal Fa(t−1) representing a current mechanical driving force being provided by the motor 10R to develop a signal Fa(t) representing a new mechanical driving force. That is, Fa(t)=Fa(t−1)+dFa. Hereinafter, the amount by which the digital mechanical-driving-force representative signal is to be changed is referred to as change amount dFa.

Figure 4:
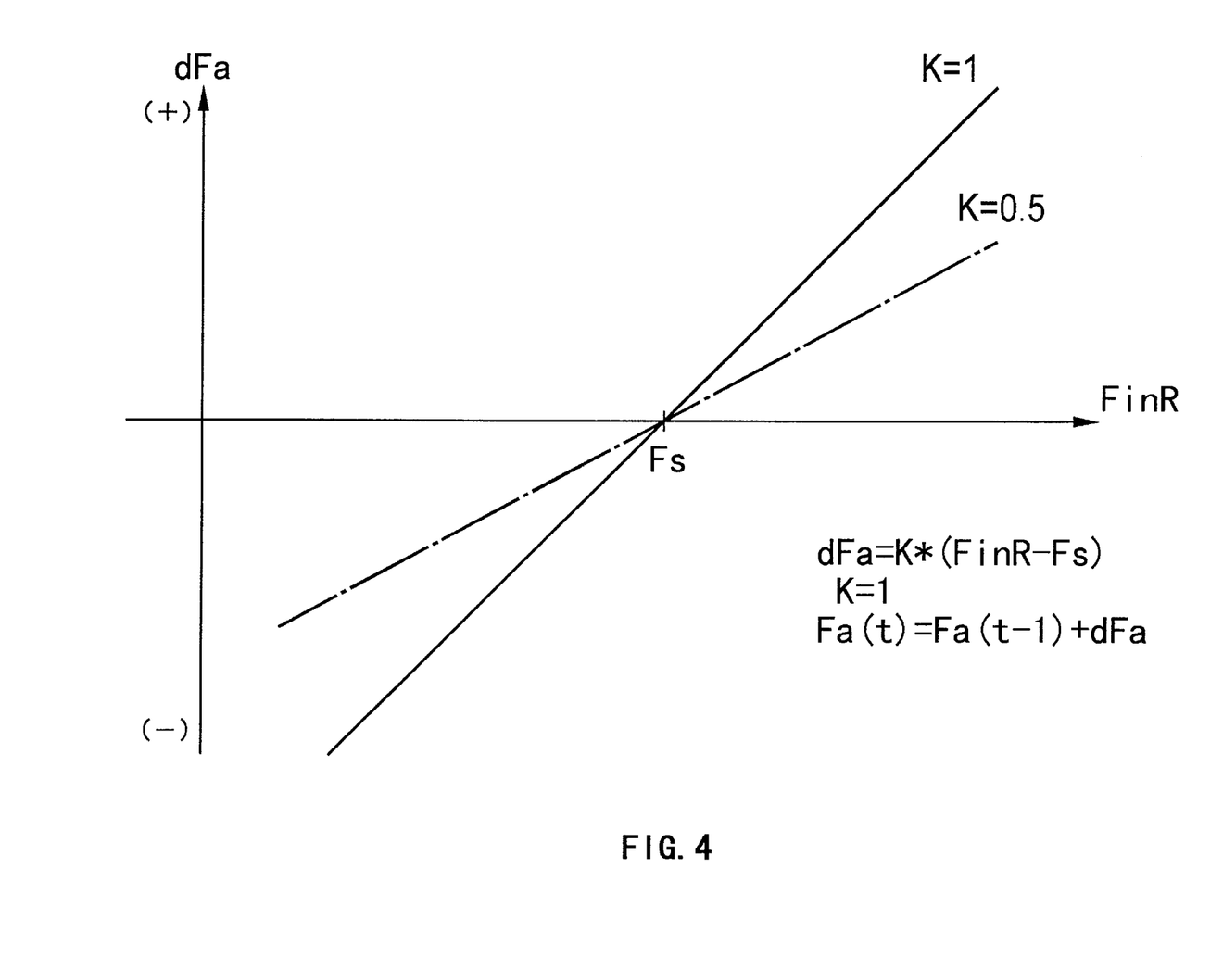
FIG. 4 shows a first example of the relationship between a digital manual-driving-force representative signal and the amount of change by which a mechanical driving force is to be changed.

It should be noted that once the absolute value of the digital manual-driving-force representative signal FinR exceeds the preset value Fs, the calculation of the change amount dFa is continued even if the signal FinR decreases below the preset value Fs. A solid line in FIG. 4 represents a relationship between the change amount dFa and the signal FinR after the signal FinR exceeds the preset value Fs.

Let it be assumed that the preset value Fs is 3 and the value of the digital manual-driving-force representative signal FinR is changed from 3 to 4 and remains to be 4. (These values 3 and 4 may correspond to forces of, for example, 3 Kg and 4 Kg.) Then, the change amount dFa continues to be 1, and the mechanical driving force will be continuously incremented by 1 from 0 even if the manual driving force is not changed. Accordingly, even if the running resistance of the wheelchair increases, there is no need to increase the manual driving force.

Next, let it be assumed that the preset value Fs is 3, and that the digital manual-driving-force representative signal FinR changes from 3 to 4, 6, 7, 8, 7, 5, 4, 2, 1, 1 and then to 3, successively. The change amount dFa changes from 1, to 3, 4, 5, 4, 2, 1, −1, −2, −2 and then to 0, successively, so that the mechanical driving force changes from 0 to 1, 4, 8, 13, 17, 19, 20, 19, 17 and then to 17, successively. Thereafter, if the manual driving force is maintained at a value, e.g. 3 Kg, corresponding to Fs=3, the mechanical driving force is maintained at a value, e.g. 17 Kg, corresponding to Fa(t)=17. Thus, a desired mechanical driving force can be attained and maintained by first applying to the manual-driving-force sensing unit 20R, a manual driving force of such a value relative to the preset value that the desired mechanical driving force can be provided and, then, maintaining the manual driving force at the preset value.

In the above described example, the difference between FinR and Fs is used as the change amount dFa. In other words, the change amount dFa by which the mechanical driving force is changed is determined by multiplying the difference, (FinR−Fs), between FinR and Fs by a factor K=1. The change amount dFa, however, may be the difference, (FinR−Fs) multiplied by any other factor K. e.g. a factor within a range between 0, exclusive, and a value around 1, i.e. a value slightly smaller or greater than 1.

The dash-and-dot line in FIG. 4 represents the relationship between the change amount dFa for the mechanical driving force and the digital manual-driving-force representative signal FinR above the preset value Fs when the factor K is equal to 0.5. When a factor K which is smaller than 1 but larger than 0 is used to multiply the difference (FinR−Fs) with, the response of the mechanical driving force to manual driving force is slow. For instance, in the above-described case in which the manual driving force is successively changed, the mechanical driving force changes from 0 to 1, 4, 8, 13, 17, 19, 20, 19, 17 and then to 17, successively, as described above, when the factor K is 1. On the other hand, with the factor K=0.5, the mechanical driving force will change from 0 to 0.5, 2, 4, 6, 5, 8.5, 9.5, 10, 9.5, 8.5 and, then, to 8.5. This means that the change amount dFa is one-half the one for the factor K=1.

For a negative value of the digital manual-driving-force representative signal FinR, the relationship between FinR and dFa can be represented by a line which is line-symmetric with the line shown in FIG. 4, with the vertical axis being the axis of symmetry. In this case, too, the change amount dFa is determined in a manner similar to the manner described above. Alternatively, when the signal FinR has a negative value, −FinR may be calculated and, then, Fs is subtracted therefrom.

Further, a number of values may be prepared beforehand for the factor K, which may be within a range of from a value greater than 0 to a value slightly smaller or larger than 1, and an attendant to the user of the wheelchair can choose any desired value from them.

In the above-described examples, the factor K which is used to determine the change amount dFa is constant regardless of the value of the digital manual-driving-force representative signal FinR. However, as shown in FIGS. 5, 7, 8 and 9, different values may be used for the factor K for different values of the digital manual-driving-force representative signal FinR. In such a case, too, a new digital mechanical-driving-force representative signal Fa(t) is determined in accordance with the expression, Fa(t−1)+dFa.

Figure 5:
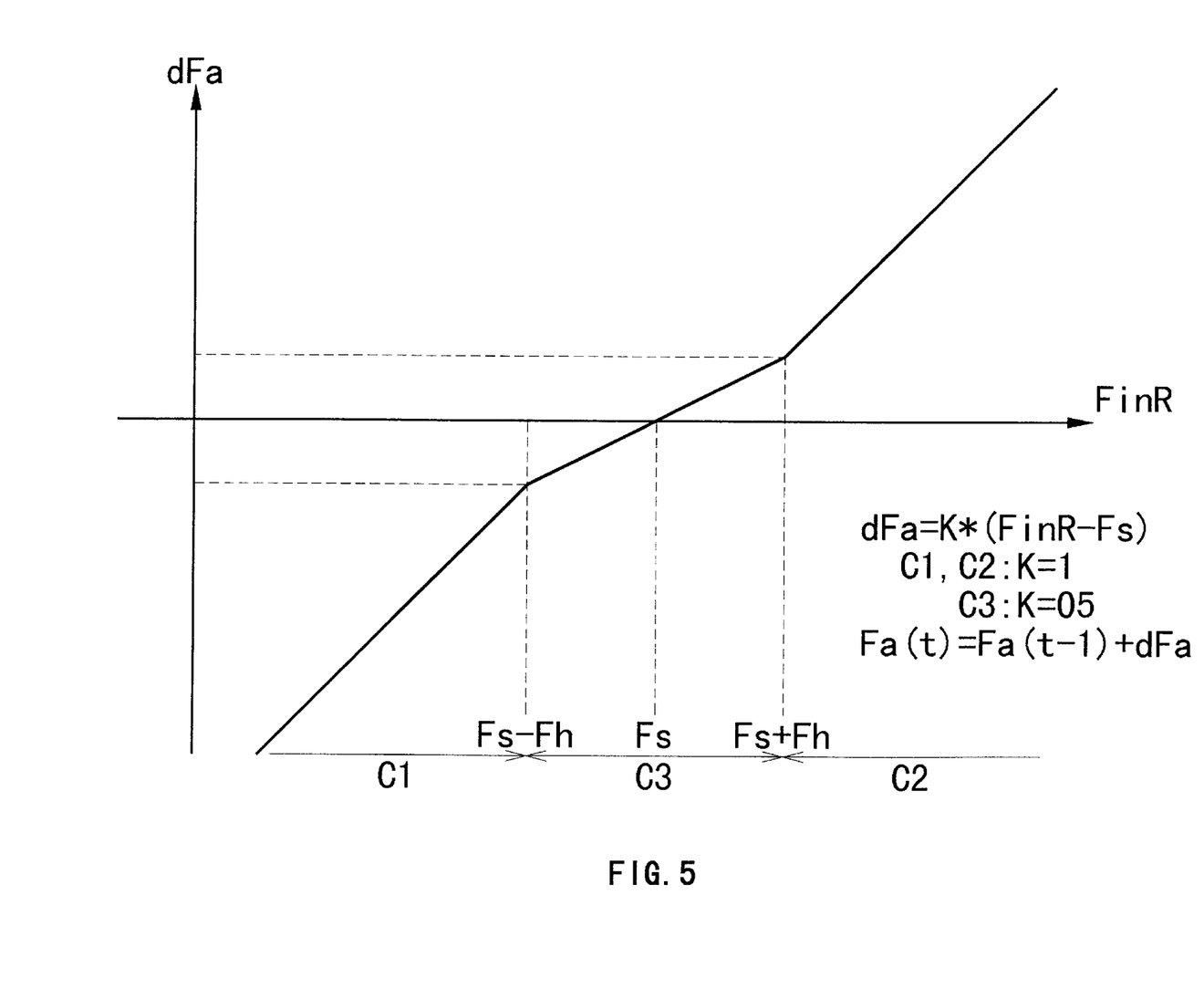
FIG. 5 shows a second example of the relationship between the digital manual-driving-force representative signal and the amount of change by which the mechanical driving force is to be changed.

Referring to FIG. 5, two threshold values (Fs−Fh) and (Fs+Fh) are set on opposite sides of the preset value Fs for values of FinR smaller and greater than Fs, respectively, where 0<Fh<Fs. Thus, three control regions C1, C2 and C3 are formed. For the control region C1 where FinR is smaller than the threshold value (Fs−Fh) and for the control region C2 where FinR is larger than the threshold value (Fs+Fh), the factor K is, for example, 1. For the control region C3 in which FinR is between (Fs−Fh) and (Fs+Fh), the factor K is, for example, 0.5. For the preset value 2.5, which may correspond to 2.5 Kg, Fh may be, for example, 0.5, which may correspond to 0.5 Kg.

Because of a relatively small K for FinR in the vicinity of the preset value Fs, the response of the mechanical driving force to the digital manual-driving-force representative signal FinR is slow, which realizes a stable operation of the wheelchair 1. In addition, in a wheelchair like the wheelchair 1 shown in which the driving of the drive wheel 6R is controlled in accordance with the manual driving force as sensed by the manual-driving-force sensing unit 20R and the driving of the drive wheel 6L is controlled in accordance with the manual driving force as sensed by the manual-driving-force sensing unit 20L, the wheelchair can be easily driven straight even when the manual driving forces as sensed by the respective units 20R and 20L are unbalanced.

Figure 6:
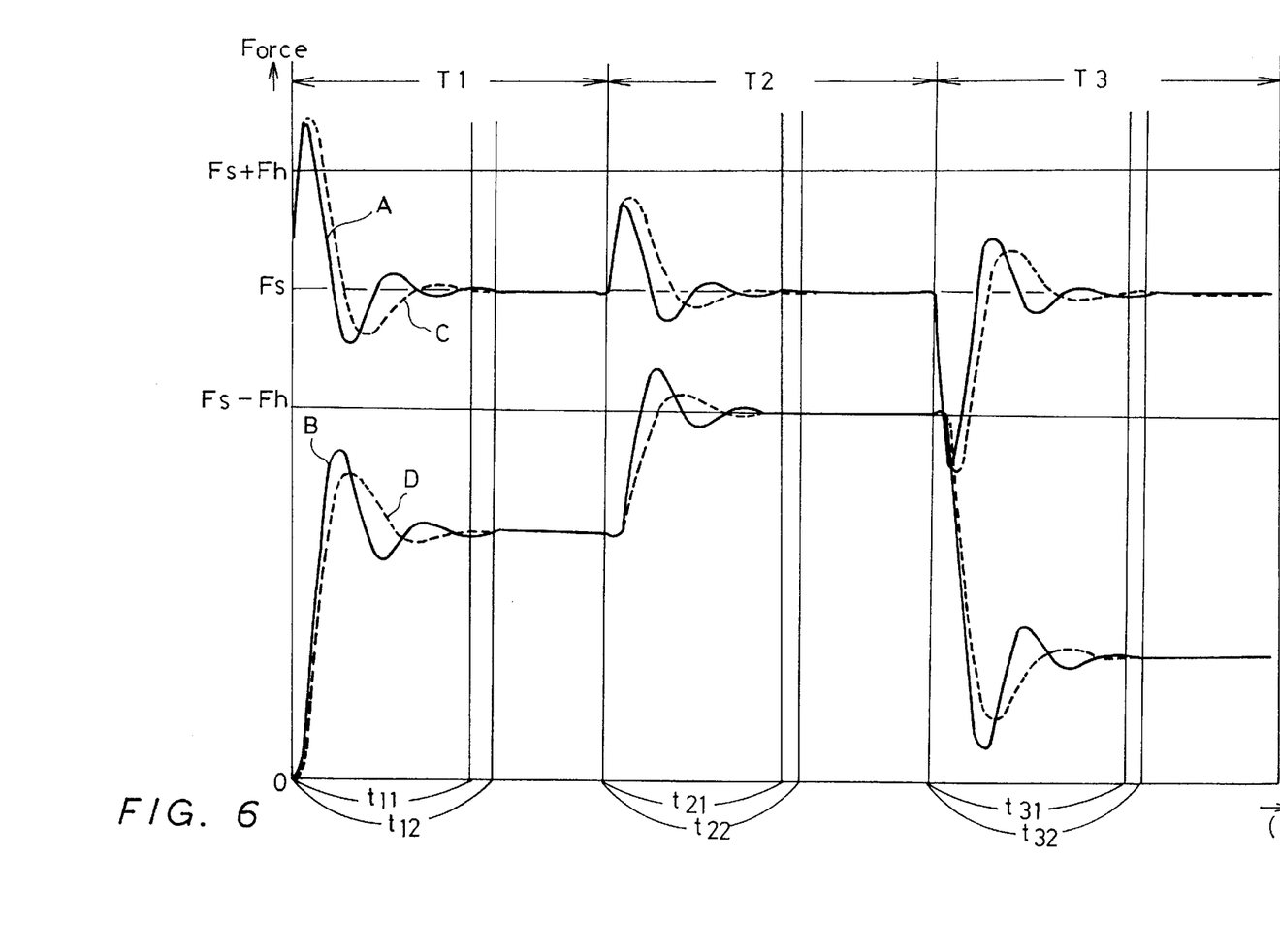
FIG. 6 shows a relationship between a manual driving force and a mechanical driving force resulting from employing the relationship shown in FIG. 4 or 5.

This operation is described in detail with reference to FIG. 6. In FIG. 6, a curve A represents the changes of the manual driving force with time shown in FIG. 4, a curve B represents the changes of the mechanical driving force provided by the motor 10R with time shown in FIG. 4, a curve C represents the changes of the manual driving force with time shown in FIG. 5, and a curve D represents the changes of the mechanical driving force provided by the motor 10R with time shown in FIG. 5. It is assumed that in a zone T1 shown in FIG. 6, the wheelchair 1 is driven against a running resistance L1, and the running resistance in a zone T2 is L2 which is greater than L1, and the running resistance in a zone T3 is L3 which is smaller than L1.

In the case of FIG. 4, in the zone T1, for example, the mechanical driving force provided by the motor 10R increases with increase of the manual driving force. When the combined driving force provided by the sum of the manual driving force and the mechanical driving force exceeds the one the wheelchair driver desires, the wheelchair driver, e.g. the attendant to the user of the wheelchair 1, reduces the manual driving force he or she is applying to the wheelchair via the manual-driving-force sensing unit 20R. Then, although the mechanical driving force continues to increase, the amount of change in the mechanical driving force decreases. If the manual driving force decreases below the preset value Fs, the mechanical driving force begins to decrease. Then, when the combined driving force provided by the sum of the manual driving force and the mechanical driving force becomes smaller than the desired value, the wheelchair driver starts increasing the manual driving force. It should be noted that the absolute value of the difference of the manual driving force from the value corresponding to the preset value Fs at the time when the manual driving force starts increasing this time is smaller than the absolute value of the corresponding difference at the beginning of the reduction of the manual driving force.

At the beginning of increase of the manual driving force, however, the mechanical driving force provided by the motor 10R continues to decrease, but the amount of change of the mechanical driving force becomes smaller. When the manual driving force exceeds the preset value Fs, then, the mechanical driving force begins to increase. When the combined driving force provided by the sum of the manual driving force and the mechanical driving force exceeds the desired value, the wheelchair driver reduces the manual driving force. It should be noted that the absolute value of the difference of the manual driving force from the preset value Fs when the wheelchair driver starts reducing the manual driving force is smaller than the corresponding value when the driver started increasing the manual driving force. In other words, as the speed of the wheelchair 1 based on the combined driving force provided by the sum of the manual driving force and the mechanical driving force gradually approaches a desired speed, the manual driving force gradually approaches the preset value Fs. In this way, the speed of the wheelchair 1 becomes the desired speed and, at the same time, the manual driving force becomes the preset value Fs.

As stated above, in the case shown in FIG. 4, the factor K is maintained to be 1. In contrast, in the case shown in FIG. 5, the factor K is 0.5 when the value of the manual-driving-force representative signal FinR is within a range between the threshold values (Fs+Fh) and (Fs−Fh), and is 1 when the signal FinR is outside this range.

Accordingly, until the manual driving force exceeds the value corresponding to the threshold value (Fs+Fh), the factor K remains 0.5, so that the response of the mechanical driving force is slower than in the case of FIG. 4. After the manual driving force exceeds the value corresponding to the threshold value (Fs+Fh), the factor K changes to 1, and, therefore, the response of the mechanical driving force becomes faster than in the case of K=0.5. However, since the mechanical driving force provided before the manual driving force exceeds the value corresponding to the threshold value (Fs+Fh) is smaller than the mechanical driving force which would be provided when the factor K=1 is used, the manual driving force at the time when the desired combined driving force is attained is larger than in the case of FIG. 4. When the manual driving force is decreased, the amount of change for the mechanical driving force is the same as in the case of FIG. 4 in the range of the manual driving forces greater than the value corresponding to the threshold value (Fs+Fh), because of the factor K=1.

When the manual driving force reduces below the value corresponding to the threshold value (Fs+Fh), the factor is changed from 1 to 0.5 and, therefore, the change amount for the mechanical driving force is smaller than in the case of FIG. 4. When the combined driving force provided by the sum of the manual driving force and the mechanical driving force decreases below the desired one, the manual driving force is increased, which results in increase of the mechanical driving force. However, because the factor K is 0.5, the amount of change for the mechanical driving force is smaller than in the case shown in FIG. 4. Accordingly, the increase of the combined driving force is gradual. When the manual driving force slightly exceeds the preset value Fs, the combined driving force provided by the sum of the manual driving force and the mechanical driving force slightly exceeds the desired combined driving force. In this way, the wheelchair 1 can be brought to a desired speed by bringing the manual driving force to the preset value Fs.

In the zone T2, the running resistance acting on the wheelchair has become larger than in the zone T1. Accordingly, a larger manual driving force is exerted. In this case, however, the manual driving force does not exceed the value corresponding to the threshold value (Fs+Fh). In this case, too, the factor K is 1 in the case of FIG. 4, while it is 0.5 in the case of FIG. 5. Because of this difference of the factor K, the response of the mechanical driving force is slower in FIG. 5, which enables a wheelchair driver to manage the wheelchair more easily.

In the zone T3, the running resistance acting on the wheelchair becomes smaller than the one in the zone T1. Then, the manual driving force is decreased to a value smaller than the one corresponding to the threshold value (Fs−Fh). Accordingly, the change of the manual driving force and the change of the mechanical driving force provided by the motor 10R are in the opposite sense to those in the zone T1.

In FIG. 6, t11, t12 and t13 represent settling times for the case shown in FIG. 5, and t21, t22 and t23 represent settling times for the case shown in FIG. 4. The settling time is a time period between the starting point of each of the zones T1, T2 and T3 at which the manual driving force is begun to change and a time at which the wheelchair 1 attains a desired speed and, hence, the manual driving force is returned to the value corresponding to the preset value Fs. As is seen from FIG. 6, the settling times are shorter in the case of FIG. 5 than in the case of FIG. 4.

Figure 7:
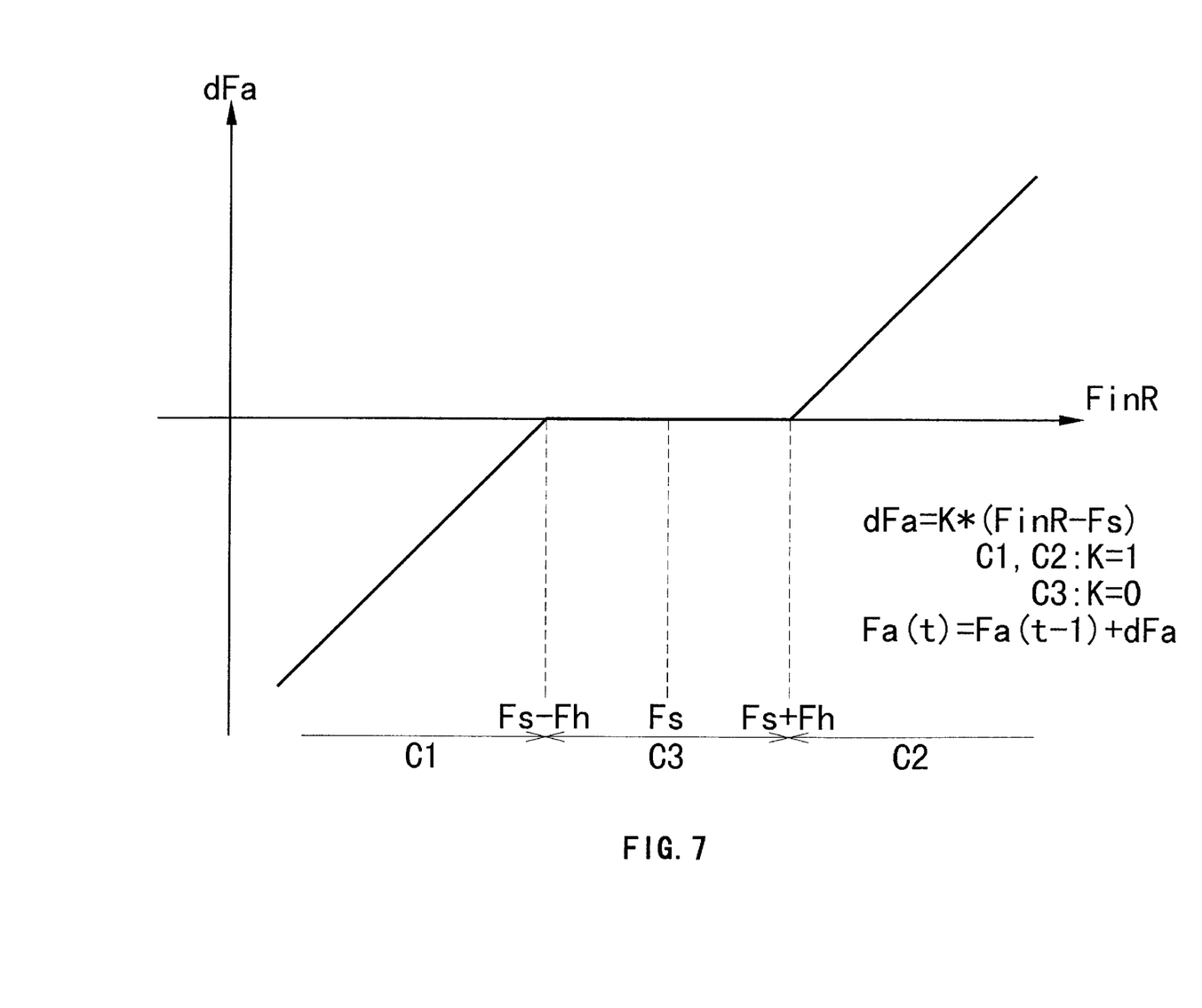
FIG. 7 shows a third example of the relationship between the digital manual-driving-force representative signal and the amount of change by which a mechanical driving force is to be changed.

Next, referring to FIG. 7, there are shown three control regions C1, C2 and C3 which are similar to the corresponding ones in FIG. 5. Different from FIG. 5, the factor K in FIG. 7 is 1 for the control regions C1 and C2, while it is 0 for the control region C3. With the factor K=0 for the control region C3, the mechanical driving force does not change even when the digital manual-driving-force representative signal FinR changes in the vicinity of Fs or in the control region C3. Accordingly, the wheelchair 1 exhibits a stable operation, and a wheelchair driver can drive the wheelchair easily. In addition, even if the manual driving forces as detected through the manual-driving-force sensing units 20R and 20L are unbalanced, the wheelchair driver can easily manage the wheelchair to move it straight.

The factor K for the control region C3 is not limited to 0, but it can be a value close to 0, e.g. 0.1 or 0.2.

In the case shown in FIG. 8, two threshold values for FinR are set on each of opposite sides of the preset value Fs, namely, (Fs−Fh1) and (Fs−Fh2) below Fs, and (Fs+Fh1) and (Fs+Fh2) above Fs, where Fh1<Fh2. This provides five control regions, namely, a control region C4 for values not larger than (Fs−Fh2), a control region C5 for values not smaller than (Fs+Fh2), a control region C6 for values not smaller than (Fs−Fh2) and smaller than (Fs−Fh1), a control region C7 for values not larger than (Fs+Fh2) and larger than (Fs+Fh1), and a control region C8 for values between (Fs−Fh2) and (Fs+Fh2). In the embodiment shown in FIG. 8, the factor K is 0.5 for the control regions C4 and C5. The factor K for the control regions C6 and C7 is 1.2, and the factor K for the control region C8 is 0.5. Of course, the factors K having other values may be used.

Because the factor K for the control regions C6 and C7 is larger than the factors K for the other control regions C4, C5 and C8, the time during which the digital manual-driving-force representative signal FinR deviates from the preset value Fs can be shorter. The factor K for the control regions C4 and C5, which are the remotest from the preset value Fs, is small. Accordingly, even when the manual driving force changes so greatly that the signal FinR can enter into these control regions, the wheelchair 1 is not abruptly accelerated or decelerated. Because the factor K for the control region C8 in which the preset value Fs lies is small, changes of the signal FinR in the control region C8 are responded to by the mechanical driving force slowly, as in the case shown in FIG. 5. Accordingly, stable operation of the wheelchair 1 is achieved in the control region C8. Furthermore, with this arrangement, the wheelchair 1 can be driven straight with ease in the control region where the signal FinR is in the vicinity of the preset value Fs.

As described above, the factors K for the control regions C6 and C7 and for the control regions C4, C5 and C8 can have other values. In addition, all of the control regions may have different factors K.

Furthermore, the number of the control regions is not limited to three or five, but it may be any number equal to three or larger.

Figure 9:
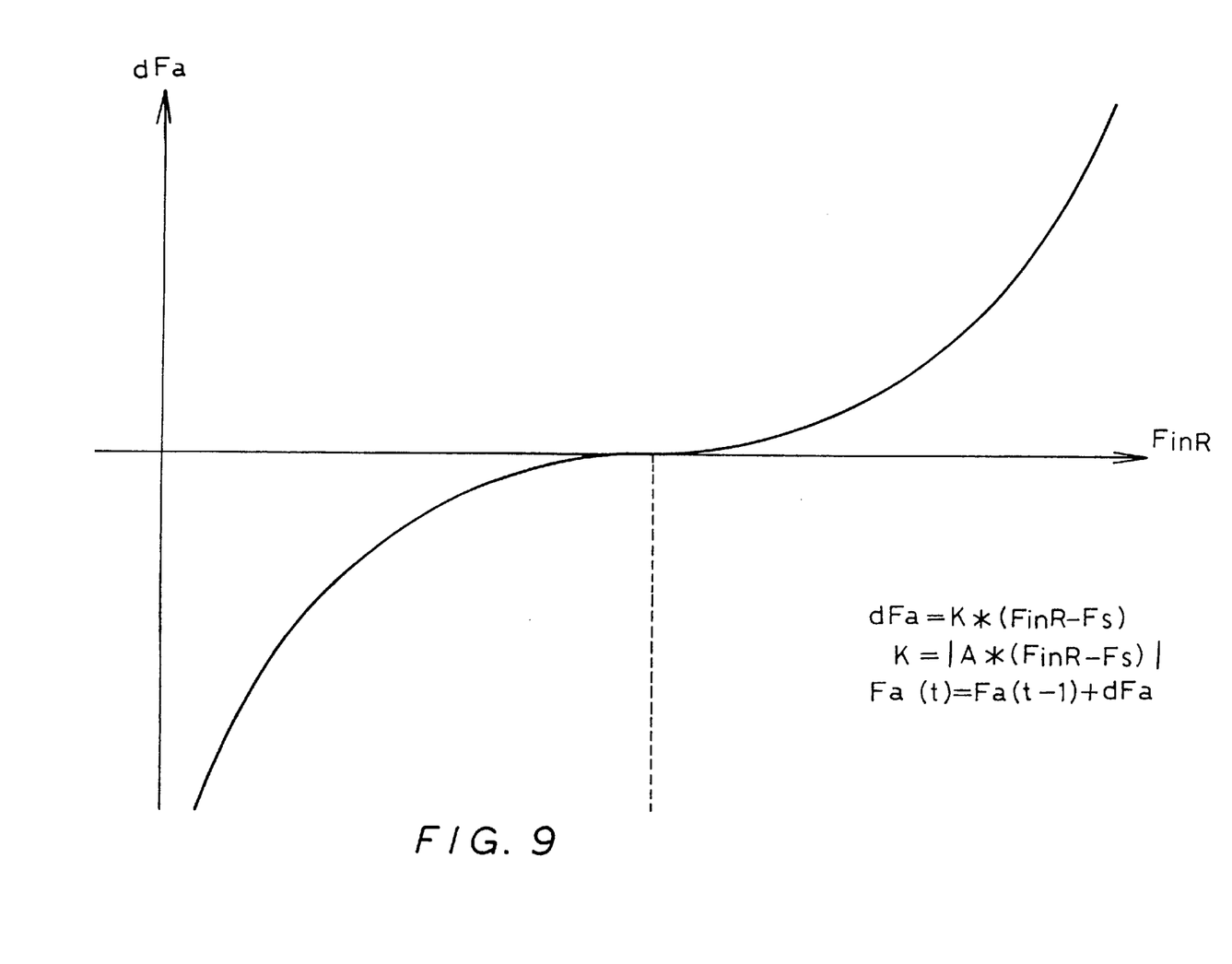
FIG. 9 shows a fifth example of the relationship between the digital manual-driving-force representative signal and the amount of change by which a mechanical driving force is to be changed.

FIG. 9 shows an example in which the factor K is the absolute value of the product of the difference between the value of the digital manual-driving-force representative signal FinR and the preset value Fs by a predetermined constant A, i.e. |A*(FinR−Fs)|. Accordingly, the change amount dFa for the digital mechanical-driving-force representative signal is a monotonously increasing quadratic function with |FinR−Fs| being an argument. Then, when the signal FinR is in the vicinity of the preset value Fs, the response of the mechanical driving force can be suppressed, which makes it possible to provide stable operation of the wheelchair 1. As the value of the signal FinR deviates from the preset value Fs, the response of the mechanical driving force increases. Accordingly, when a large manual driving force is applied to the wheelchair, a large change amount for the mechanical driving force results and, therefore, the driver or attendant can operate the wheelchair 1 smoothly.

The factor K may be the absolute value of the product of the m-th power of the difference between FinR and Fs, by a constant A, where m is an integer equal to or greater than 2.

FIGS. 5, 7, 8 and 9 show the relationships between FinR and dFa only for positive values of FinR. For negative values of FinR, the dFa can be represented by curves symmetric with the ones shown, with the vertical axis being the axis of symmetry, and is computed in the same manner as illustrated in FIGS. 5, 7, 8 and 9. In the above-described computations of dFa, −FinR may be used in place of FinR when the signal FinR is negative.

The digital mechanical-driving-force representative signal Fa(t) determined in the manner as described above is applied to the motor drive unit 16R, and the motor drive unit 16R applies a motor drive signal corresponding to the digital signal Fa(t) to the motor 10R to drive it.

Figure 10:
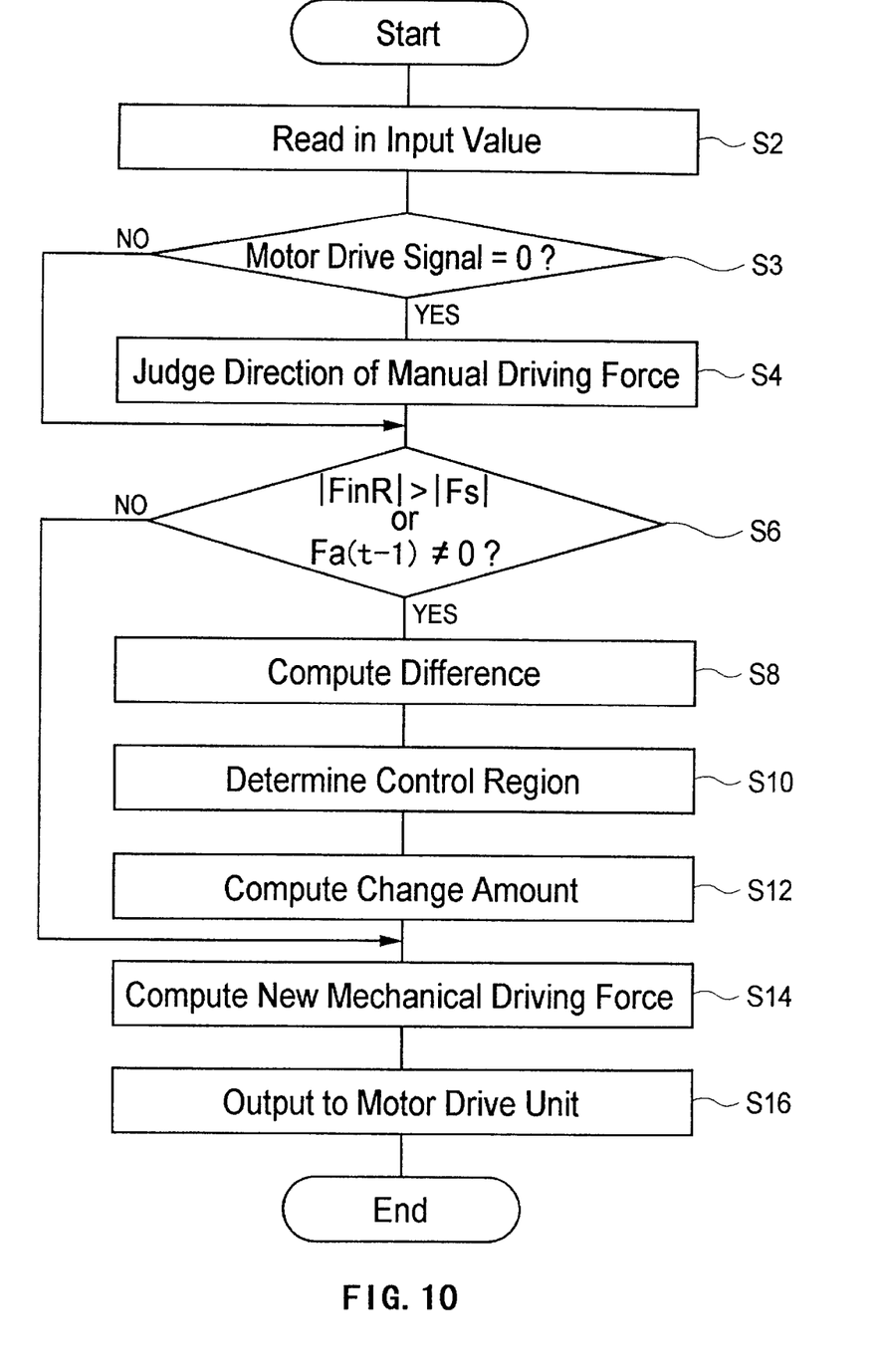
FIG. 10 is a flow chart illustrating operation of the control apparatus shown in FIG. 2.

The processing performed by the control unit 18R for providing the above-described control is described by means of the flow chart shown in FIG. 10. Similar control is provided by the control unit 18L independent of the control unit 18R.

First, input values are read in and converted into digital signals at predetermined sampling intervals (STEP S2). Specifically, a manual-driving-force representative signal from the manual-driving-force sensing unit 20R is read into the control unit 18R and converted into a digital manual-driving-force representative signal FinR.

Next, the motor drive signal applied from the motor drive unit 16R to the motor 10R is read into the control unit 18R, and a judgment is made as to whether the motor drive signal is zero (Step S3). If the motor drive signal is zero, the direction in which the manual-driving-force is applied is determined (STEP S4). Specifically, judgment is made as to whether the digital manual-driving-force representative signal FinR is positive or negative, to thereby determine whether the motor 10 R should be driven to rotate forward or backward.

If it is judged that the motor drive signal is not zero in Step S3, the processing skips Step S4 to Step S6.

In Step S6, judgment is made as to if the absolute value of the signal FinR is greater than the absolute value of the preset value Fs, or if the digital mechanical-driving-force representative signal Fa(t−1) is not zero. The order of these judgment procedures in STEP S6 can be reversed. The answer to STEP S6 is NO only when the absolute value of the signal FinR is smaller than the absolute value of the preset value Fs and, at the same time, the signal Fa(t−1) is zero. Accordingly, once the absolute value of the signal FinR exceeds the absolute value of the preset value Fs, so that the motor 10R starts being energized, the answer to STEP S6 remains to be YES even when the absolute value of the signal FinR becomes smaller than the absolute value of the preset value Fs because the motor 10R is being energized.

If the answer to STEP S6 is YES, the difference in absolute value between FinR and Fs is computed (STEP S8). This is in preparation for determining a change amount dFa for the digital mechanical-driving-force representative signal Fa.

Next, a judgment is made as to which control region the digital manual-driving-force representative signal FinR lies in (STEP S10). In the cases illustrated in FIGS. 5 and 7, the control region C1, C2 or C3 in which FinR lies is determined by comparing FinR with the respective threshold values (Fs−Fh) and (Fs+Fh). In the case illustrated in FIG. 8, FinR is compared with the respective threshold values (Fs−Fh2), (Fs−Fh1), (Fs+Fh1) and (Fs+Fh2) to find the control region C4, C5, C6, C7 or C8 in which FinR lies.

Figure 8:
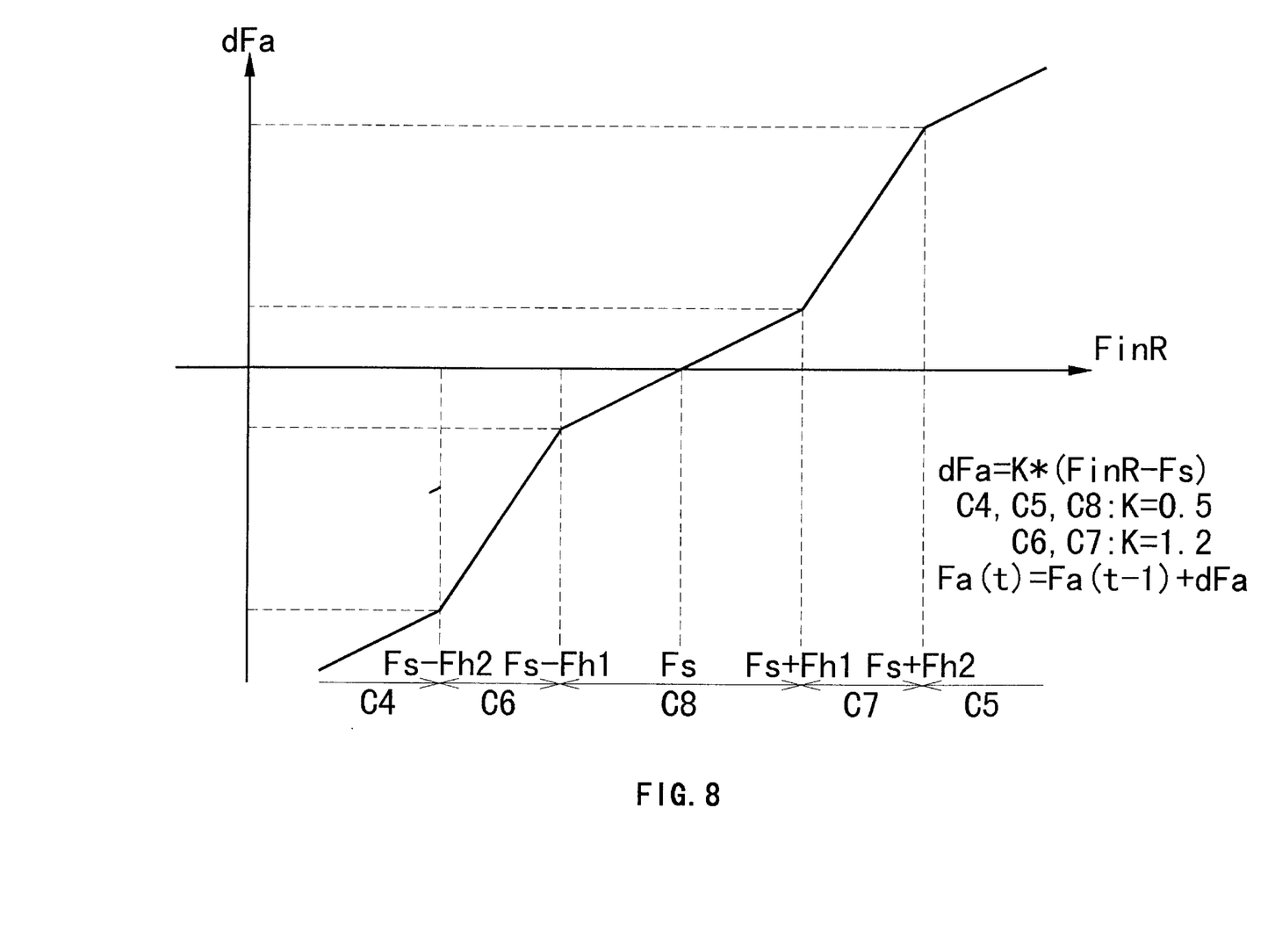
FIG. 8 shows a fourth example of the relationship between the digital manual-driving-force representative signal and the amount of change by which a mechanical driving force is to be changed.

Alternatively, the control region can be determined by judging if (FinR−Fs) is smaller than −Fh, between −Fh and Fh inclusive, or greater than Fh, in the cases illustrated in FIGS. 5 and 7, or by judging if (FinR−Fs) is smaller than −Fh2, between −Fh2 inclusive and −Fh1 exclusive, between −Fh1 and Fh1 inclusive, between Fh1 exclusive and Fh2 inclusive, or greater than Fh2 in the case as illustrated in FIG. 8. Determination of the control region in which FinR is lying determines the factor K for the determined control region.

It should be noted that in the case of FIG. 4, the factor K is constant and, therefore, STEP S10 can be eliminated. Also, in the case as illustrated in FIG. 9, because the factor K is the absolute value of the product of the difference between FinR and Fs by the constant A, the computation of the factor K, in place of the determination of the control region, is done in STEP S10.

Thereafter, the change amount dFa for the mechanical driving force is computed on the basis of the difference computed in STEP S8 and the factor K determined in STEP S10 (STEP S12). The change amount dFa is computed by the expression K*(FinR−Fs).

The change amount dFa computed in STEP S12 and Fa(t−1) obtained in STEP S2 are summed, which results in a new digital mechanical-driving-force representative signal Fa(t) (STEP S14).

When the answer to STEP S6 is NO, the processing jumps to STEP S14. In this case, however, the digital mechanical-driving-force representative signal Fa(t) is zero, and also the motor drive signal applied to the motor 10R is zero. Accordingly, if the motor drive signal is zero and the digital manual-driving-force representative signal FinR has not yet exceeded the preset value Fs, the motor 10R is not energized. However, once FinR exceeds Fs, resulting in the energization of the motor 10R, the motor 10R continues to be energized even when the signal FinR decreases below the preset value Fs.

The digital mechanical-driving-force representative signal Fa(t) determined in this way is converted into a mechanical driving signal for application to the motor drive unit 16R (STEP S16). At the same time, the direction signal representative of the direction in which the motor 10R should rotate determined on the basis of the direction determined in STEP S4 is also applied to the motor drive unit 16R. This direction signal remains unchanged until the digital mechanical-driving-force representative signal is judged to be zero in Step S3.

In accordance with the mechanical driving signal and the direction signal applied to the motor drive unit 16R, the motor drive unit 16R applies to the motor 10R a motor drive signal prepared by a PWM (pulse width modulation) technique for controllably driving the motor 10R, so that the motor 10R provides the wheelchair 1 with mechanical driving force corresponding to Fa(t).

The preset value Fs, the various factors K, and the various threshold values are stored beforehand in the microprocessors of the control units, but they may be adapted to be changed as desired.

In the above-described embodiment, one of the relationships between the digital manual-driving-force representative signal and the change amount for the mechanical-driving-force representative signal shown in FIGS. 4, 5, 7, 8 and 9 is employed. In place of it, a control unit may be constructed to have all of these relationships preprogrammed in it from which a desired one can be selected.

Furthermore, in the above-described embodiment, the threshold values (Fs−Fh), (Fs+Fh), (Fs−Fh1), (Fs−Fh2), (Fs+Fh1) and (Fs+Fh2) are provided for FinR, but they may be determined for (FinR−Fs). In this case, the threshold values are −Fh, Fh, −Fh1, Fh1, −Fh2, and Fh2, respectively, and the determination of the control region done in STEP S10 is performed by judging which control region the value (FinR−Fs) is lying in.

What is claimed is:

1. A motor-driven vehicle control apparatus comprising a control unit for controlling a driving unit of a motor-driven vehicle to generate a first mechanical driving force supplementary to a manual driving force applied by a vehicle driver for driving said vehicle when said manual driving force reaches a preset value;

wherein said control unit comprises:
 a) sampling means for sampling said manual driving force at times spaced by a fixed time interval from each other;
 b) means for computing an amount of change for use in changing said mechanical driving force by subtracting said preset value from the sampled manual driving force; and
 c) means for detecting a current mechanical driving force at said times and causing said driving unit to develop a second supplementary mechanical driving force for replacing the first supplementary driving force, said second supplementary driving force being related to the sum of said detected current mechanical driving force and said amount of change.

2. The motor-driven vehicle control apparatus according to claim 1 wherein said computing means multiplies the result of the subtraction of said preset value from said sampled manual driving force by a factor to determine a monotonously increasing amount of change for use in changing said mechanical driving force.

3. A motor-driven vehicle control apparatus comprising a control unit for controlling a driving unit of a motor-driven vehicle to generate a first mechanical driving force supplementary to a manual driving force applied by a vehicle driver for driving said vehicle when said manual driving force reaches a preset value;

wherein said control unit comprises:
 a) sampling means for sampling said manual driving force at times spaced by a fixed time interval from each other;
 b) means for dividing a range in which a value related to the sampled manual driving force can lie into a plurality of control regions defined by a given number of threshold values, setting factors for respective ones of said control regions, determining which one of said control regions said value related to said sampled manual driving force lies in, and determining the factor of the control region in which said related value lies;
 c) means for subtracting said preset value from said sampled manual driving force and multiplying the result of said subtraction by said determined factor to thereby compute a monotonously increasing amount of change for use in changing said mechanical driving force; and
 d) means for detecting a current mechanical driving force at each of said times and causing said driving unit to develop a second supplementary mechanical driving force for replacing the first supplementary driving force, said second supplementary driving force being related to the sum of said detected current mechanical driving force and said amount of change.

4. The motor-driven vehicle control apparatus according to claim 3 wherein a factor for the control region in which a value corresponding to said preset value lies is smaller than the factor for one of the remaining control regions.

5. The motor-driven vehicle control apparatus according to claim 4 wherein the factor for said control region which said value corresponding to said preset value lies in is substantially zero.

6. The motor-driven vehicle control apparatus according to claim 3 wherein said plurality of control regions comprises three control regions including a center control region and two end control regions on opposite sides of said center control region; a value corresponding to said preset value is in one of said two end control regions; and the factors for said two end control regions is smaller than the factor for the center control region.

7. The motor-driven vehicle control apparatus according to claim 3 wherein said plurality of control regions includes four or more control regions; and a factor for the control region in which a value corresponding to said preset value lies and a factor for the control region farthest from the control region in which said value corresponding to said preset value lies are smaller than the factors of the remaining control regions.

8. A motor-driven vehicle control apparatus comprising a control unit for controlling a driving unit of a motor-driven vehicle to generate a first mechanical driving force supplementary to a manual driving force applied by a vehicle driver for driving said vehicle when said manual driving force reaches a preset value; wherein said control unit comprises:

a) sampling means for sampling said manual driving force at times spaced by a fixed time interval from each other, b) means for subtracting said preset value from said sampled manual driving force and multiplying the result of said subtraction by a predetermined factor to thereby compute an amount of change for use in changing said mechanical driving force, said amount of change being a monotonously increasing portion of an n-th order function where n is equal to or greater than two; and c) means for detecting a current mechanical driving force at each of said times and causing said driving unit to develop a second supplementary mechanical driving force for replacing the first supplementary driving force, said second supplementary driving force being related to the sum of said detected current mechanical driving force and said amount of change.

* * * * *